(12) United States Patent
Jiang et al.

(10) Patent No.: US 11,904,865 B2
(45) Date of Patent: Feb. 20, 2024

(54) INTELLIGENT SAFE VEHICLE SPEED MEASUREMENT METHOD AND SYSTEM CAPABLE OF CONSIDERING STATE OF ROAD SURFACE

(71) Applicant: CHANG'AN UNIVERSITY, Shaanxi (CN)

(72) Inventors: Wei Jiang, Shaanxi (CN); Wanli Ye, Shaanxi (CN); Aimin Sha, Shaanxi (CN); Hao Lu, Shaanxi (CN); Dongdong Yuan, Shaanxi (CN); Jinhuan Shan, Shaanxi (CN); Pengfei Li, Shaanxi (CN); Jingjing Xiao, Shaanxi (CN)

(73) Assignee: CHANG'AN UNIVERSITY, Shaanxi (CN)

( * ) Notice: Subject to any disclaimer, the term of this patent is extended or adjusted under 35 U.S.C. 154(b) by 194 days.

(21) Appl. No.: 17/670,527

(22) Filed: Feb. 14, 2022

(65) Prior Publication Data
US 2022/0161802 A1 May 26, 2022

Related U.S. Application Data

(63) Continuation of application No. PCT/CN2020/105375, filed on Jul. 29, 2020.

(30) Foreign Application Priority Data

Dec. 17, 2019 (CN) .......................... 201911304791.6

(51) Int. Cl.
*B60W 40/06* (2012.01)
*B60W 40/105* (2012.01)
*B60W 50/14* (2020.01)

(52) U.S. Cl.
CPC .......... *B60W 40/06* (2013.01); *B60W 40/105* (2013.01); *B60W 50/14* (2013.01);
(Continued)

(58) Field of Classification Search
CPC .. B60T 8/1725; B60T 8/1763; B60T 2210/12; B60W 40/068; B60W 40/06;
(Continued)

(56) References Cited

FOREIGN PATENT DOCUMENTS

| CN | 1156296 A | 8/1997 |
|---|---|---|
| CN | 102723001 A | 10/2012 |

(Continued)

OTHER PUBLICATIONS

Pengfei Li et al., "Application of Vehicle Mounted Mobile Measurement System in Pavement Evenness Evaluation", Beijing Surveying and Mapping, vol. 33, No. 1, Jan. 2019, pp. 67-70, DOI:10.19580/j.cnki.1007-3000.2019.01.015.

(Continued)

*Primary Examiner* — Kenneth J Malkowski

(57) ABSTRACT

Provided is an intelligent safe vehicle speed measurement method and an system capable of considering a state of a road surface, including: a laser scanning unit configured to obtain road surface textures and simulate contact under different vehicle loads and tire patterns; a wireless communication unit configured to obtain the model, load and tire information of incoming vehicles, offer a best-matching braking distance by search through database; a skid resistance prediction unit configured to obtain environmental parameters to correct the obtained best-matching braking distance, and offer a safe speed for incoming vehicles; and a warning reminder unit configured to broadcast the safe running speed to incoming vehicles. This system communicates between the vehicle and road, obtains the information from incoming vehicles in real time, and broadcasts the (Continued)

safe speed to incoming vehicles, ensuring the safety of the incoming vehicle during running.

9 Claims, 3 Drawing Sheets

(52) U.S. Cl.
CPC ..... *B60W 2420/42* (2013.01); *B60W 2420/62* (2013.01); *B60W 2530/20* (2013.01); *B60W 2556/45* (2020.02)

(58) Field of Classification Search
CPC .............. B60W 40/105; B60W 50/14; B60W 2420/62; B60W 2530/20; B60W 2556/45
See application file for complete search history.

(56) References Cited

FOREIGN PATENT DOCUMENTS

| | | |
|---|---|---|
| CN | 103407450 A | 11/2013 |
| CN | 103413460 A | 11/2013 |
| CN | 103786533 A | 5/2014 |
| CN | 105469615 A | 4/2016 |
| CN | 105818813 A | 8/2016 |
| CN | 106840471 A | 6/2017 |
| CN | 107031634 A | 8/2017 |
| CN | 107253482 A | 10/2017 |
| CN | 107735300 A | 2/2018 |
| CN | 107905057 A | 4/2018 |
| CN | 209265695 U | 8/2019 |
| CN | 110499720 A | 11/2019 |
| CN | 111127883 A | 5/2020 |
| JP | 2007024599 A | 2/2007 |

OTHER PUBLICATIONS

Yu Yang et al., "Design of Green Buildings with Negative Energy Consumption in Tibet Based on Solar Energy Technology", Building Energy Efficiency, No. 1, 2018 (Issue vol. 46, No. 323), pp. 66-70, doi:10.3969/j.issn.1673-7237.2018.01.014.

Bo Li et al., "Surface Texture and Skid Resistance of Concrete Pavement", Communications Standardization, No. 7, 2008 (Issue No. 179), pp. 154-157.

INTELLIGENT SAFE VEHICLE SPEED MEASUREMENT METHOD AND SYSTEM CAPABLE OF CONSIDERING STATE OF ROAD SURFACE

CROSS-REFERENCE TO RELATED APPLICATIONS

The present application is a continuation of International Patent Application No. PCT/CN2020/105375, filed on Jul. 29, 2020, which claims priority to Chinese Patent Application NO. 201911304791.6, filed on Dec. 17, 2019, the entire contents of which are incorporated herein by their references.

FIELD

The present disclosure belongs to the field of road traffic, and in particular, relates to an intelligent safe vehicle speed measurement method and an intelligent safe vehicle speed measurement system capable of considering a state of a road surface.

BACKGROUND

Traffic safety has always been a common problem faced by countries all over the world, and most road traffic accidents are related to decline in the anti-skid ability of road surfaces. The texture of the road surface directly determines the anti-skid performance of the vehicle, and thus determines the safe running speed and safe distance. The existing asphalt pavement has withstood various long-term loads and the influence of the natural environment, and has problems such as material degradation and texture degradation. Therefore, it is necessary to establish a real-time pavement anti-skid performance monitoring system to provide safe operating parameters for vehicles.

With the continuous development and deepening of research on smart cars and unmanned driving technologies, vehicle-road mutual communication has received more and more attention. At present, although manufacturers such as Baidu, Tsinghua, Google, Tesla, and Toyota have begun to develop unmanned cars, there is no safe driving control method and system that can accurately monitor the condition of the surface of the road in real time and feed it back to the car, which hinders the information interaction between the car and the road.

SUMMARY

Aiming at the problem that it is difficult to accurately monitor road surface conditions in real-time in the related art, a purpose of the present disclosure is to provide an intelligent safe vehicle speed measurement method and an intelligent safe vehicle speed measurement system capable of considering a state of a road surface, so as to enhance the interaction between intelligent vehicles and road surface information, and provide real-time and effective road-surface safe operation parameters for the safe braking of the future unmanned vehicles, which is helpful for the application and promotion of unmanned driving technology on existing roads.

In order to achieve the above purpose, the present disclosure adopts the following technical solutions for implementation.

An intelligent safe vehicle speed measurement system capable of considering a state of a road surface includes: a power supply unit, a warning reminder unit, a laser scanning unit, a skid resistance prediction unit and a wireless communication unit. The laser scanning unit is configured to scan the road surface to obtain a texture of the road surface, and perform stress simulation on vehicles with a variety of loads and tire patterns, to update tire-road surface contact relationships and corresponding braking distances; the wireless communication unit is configured to obtain a vehicle model, a load and tire information of an incoming vehicle and obtain a tire-road surface contact relationship, to select best matching data and obtain a corresponding predicted braking distance; the skid resistance prediction unit is configured to obtain environmental parameters of the road surface to correct the obtained predicted braking distance, and obtain a safe running speed suitable for the incoming vehicle through conversion of the corrected braking distance; the warning reminder unit is configured to recommend the safe running speed for the incoming vehicle; and the power supply unit is configured to supply electric energy for the warning reminder unit, the laser scanning unit, the skid resistance prediction unit and the wireless communication unit.

Optionally, the power supply unit includes a transformer, a power generator, and a power storage box, and both the power generator and the transformer are connected to the power storage box.

Optionally, the power generator includes solar photovoltaic panels, a thermoelectric power generator, and a pressure power generator. The pressure power generator is located under wheel track bands, the thermoelectric power generator is located on two sides of a road, and the solar photovoltaic panel is located on the two sides above the road.

Optionally, the thermoelectric power generator includes heat conducting plates and a thermoelectric power generating sheet; the heat conducting plates and the thermoelectric power generation sheet are arranged in a middle portion of an asphalt pavement layer on the two sides of the road; and the heat conducting plates are configured to transmit a high temperature of the road surface and a low temperature of a subgrade soil to two ends of the thermoelectric power generation sheet, respectively, to generate electricity; and the pressure power generator includes an encapsulation material and piezoelectric ceramic sheets that are arranged under the wheel track bands, and the encapsulation material is wrapped on an outer side of the piezoelectric ceramic sheets, and the piezoelectric ceramic sheets are configured to deform under an action of a load thereon to generate electricity.

Optionally, the warning reminder unit includes a windproof and anti-collision bracket, warning lights, reflective strips and a speed-limiting LED warning screen, wherein the windproof and anti-collision bracket is supported above road shoulders, the warning lights and the reflective strips are evenly arranged on the windproof and anti-collision bracket with an equal interval, and the speed-limiting LED warning screen is located above an middle portion of a crossbeam in the laser scanning unit and is configured to broadcast the safe running speed of the incoming vehicle obtained by the skid resistance prediction unit.

Optionally, the laser scanning unit includes a laser, a first camera, a second camera, a computer, a cantilever, and a crossbeam; the laser is installed in a middle of the crossbeam; and the first camera and the second camera are located at two ends of the cantilever, respectively; and the laser is configured to emit infrared laser light, the first camera and the second camera are configured to receive reflected infrared laser light and transmit data back to the computer to obtain a texture of the road surface, and the computer is configured to perform the stress simulation on the vehicles with the variety of loads and tire patterns through a preset finite element program, to update the tire-road surface contact relationships and the corresponding braking distances stored in the system.

Optionally, the skid resistance prediction unit includes an infrared temperature gun, a road surface water film thickness measuring instrument, an aerovane, a road surface snow thickness measuring instrument, a road surface ice thickness measuring instrument, a near-road-surface humidity sensor, and a visibility meter; the infrared temperature gun, the road surface water film thickness measuring instrument, the road surface snow thickness measuring instrument, the road surface ice thickness measuring instrument, and the near-road-surface humidity sensor are located at an inner side of the windproof and anti-collision bracket; and the aerovane and the visibility meter are located at two ends of a crossbeam in the laser scanning unit, respectively; and the infrared temperature gun, the road surface water film thickness measuring instrument, the aerovane, the road surface snow thickness measuring instrument, the road surface ice thickness measuring instrument, and the near-road-surface humidity sensor are configured to obtain the environmental parameters of the road surface, and transmit the environmental parameters to a computer in the laser scanning unit for processing.

Optionally, the skid resistance prediction unit further includes a finite element tire-road surface contact module, a braking distance prediction module, and an environmental response module, wherein the finite element tire-road surface contact module is configured to perform contact simulation on vehicle tires and the scanned texture through a computer to obtain contact stress distributions, that is, the tire-road surface contact relationships; the braking distance prediction module is configured to predict a braking distance of a vehicle by using a pre-stored regression curve of tire-road surface contact relationships and braking distances, and correct the predicted braking distance based on a temperature, a humidity, a water film thickness, a snow thickness and an ice thickness of the road surface to obtain a real-time braking distance prediction result; and the environmental response module is configured to inversely calculate a safe speed suitable for the vehicle based on the real-time braking distance prediction result in accordance with a distance to vehicles ahead, a road width, a turning radius and a visibility condition.

Optionally, the wireless communication unit is further configured to transmit the safe running speed of the incoming vehicle obtained by the skid resistance prediction unit to a vehicle intelligent operating system.

An intelligent safe vehicle speed measurement method capable of considering a state of a road surface includes: scanning the road surface to obtain a texture of the road surface, and performing stress simulation on vehicles with a variety of loads and tire patterns, to update tire-road surface contact relationships and corresponding braking distances; obtaining a vehicle model, a load and tire information of an incoming vehicle, and obtaining a tire-road surface contact relationship, to select best matching data and obtain a corresponding predicted braking distance; obtaining environmental parameters of the road surface to correct the obtained predicted braking distance, and obtaining a safe running speed suitable for the incoming vehicle through conversion of the corrected braking distance; and recommending the safe running speed for the incoming vehicle.

Compared with the related art, the present disclosure has the following beneficial effects:

The control system of the present disclosure includes a power supply unit, a warning reminder unit, a laser scanning unit, a skid resistance prediction unit and a wireless communication unit; the laser scanning unit is configured to obtain the texture topography of the road surface through infrared laser light, and the skid resistance prediction unit analyzes tire-road surface contact relationships and predicts a braking distance through finite element simulation; after information about a vehicle model, a load and tire pattern of an incoming vehicle is obtained, the braking distance is corrected by considering factors such as a temperature, a humidity, a wind speed, a water film thickness, a snow thickness and an ice thickness, and a suitable safe running speed is provided for the vehicle by combining map information (road width, turning radius and information of road ahead, etc.) preset in the system; and the speed is fed back to the incoming vehicle driver or intelligent driving system through the speed-limiting LED warning screen and the wireless communication unit. The present disclosure adopts high-precision three-dimensional scanning and finite element tire-road surface contact simulation to improve the accuracy of the prediction results; the main calculation work is completed by a computer preset program, which is easy to operate, efficient in calculation, and reliable in results; this system realizes the vehicle-road mutual communication, obtains information of the incoming vehicle in real time, and broadcasts the road surface conditions to the incoming vehicle, which ensures the safety of the vehicle during running, and is conducive to the promotion of intelligent driving vehicles. The specific advantages are as follows:

(1) The present disclosure breaks through the inherent thinking in the field of road-vehicle interaction, and provides interactive capabilities to the road, which will help the development and promotion of future intelligent driving vehicles.

(2) The multiplex power supply unit (capable of using power from various sources, e.g., solar-energy power, thermoelectric power, piezoelectric power) of the present disclosure ensures the reliability of the monitoring apparatus. It can not only be used in urban areas, but also suitable for expressways or areas with inconvenient power supply, especially suitable for highway ramp entrances, tunnel entrances and exits, bends, high level road sections, bridge sections and road sections with frequent occurrence of fog.

(3) The laser scanning unit of the present disclosure can obtain high-precision textures of the road surface, and can automatically update texture conditions of the road surface in real time, without manual intervention, which is convenient for use, simple in operation and efficient.

(4) The skid resistance prediction unit of the present disclosure adopts finite element stress simulation, which can accurately give the result of the tire-road surface contact relationship. In addition, the establishment of the braking distance database will make the solution of the present disclosure better applicable to various types of vehicles; further, the database is regularly supplemented and improved manually to ensure the reliability of the braking distance prediction of the present disclosure; further, the temperature, humidity, water film thickness, snow thickness, ice thickness and other conditions of the road surface are taken into consideration to correct the built-in prediction function, which guarantees the accuracy of the braking distance prediction of the present disclosure. More importantly, the environmental response module converts the braking distance into a safe speed according to the actual situation, which is beneficial for the driver or driving unit to obtain information intuitively and quickly, and improves the interaction efficiency.

(5) The wireless communication unit of the present disclosure adopts but is not limited to a single communication method to ensure the initial stage of the development of unmanned vehicles; and for manually driven vehicles, the speed-limiting LED warning screen is adopted to broadcast the safe speed, which realizes the full coverage of all vehicles.

Figure 1:
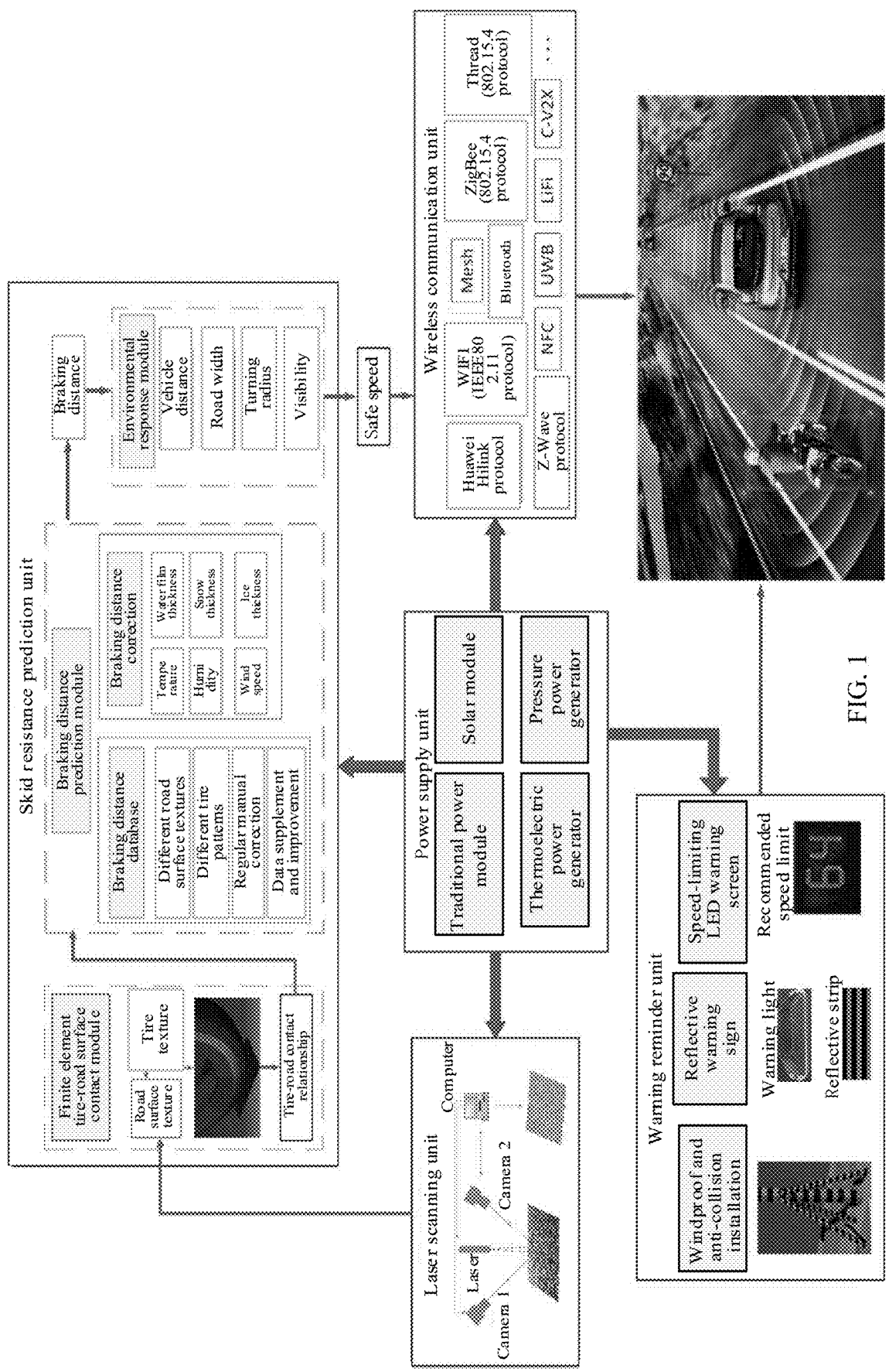
FIG. 1 is a schematic diagram of an overall composition and a use flow of the present disclosure.

Meanings of reference numerals in the drawings: 1—power supply unit, 2—warning reminder unit, 3—laser scanning unit, 4—skid resistance prediction unit, 5—wireless communication unit;

11—transformer, 12—solar photovoltaic panel, 13—thermoelectric power generator, 14—pressure power generator, 15—power storage box;

131—heat conducting plate; 132—thermoelectric power generation sheet, 141—encapsulation material, 142—piezoelectric ceramic sheet;

21—windproof and anti-collision bracket, 22—warning light, 23—reflective strip, 24—speed-limiting LED warning screen;

31—laser, 32—first camera, 33—second camera, 34—computer, 35—cantilever; 36—crossbeam;

41—infrared temperature gun, 42—road surface water film thickness measuring instrument, 43—aerovane, 44—road surface snow thickness measuring instrument, 45—road surface ice thickness measuring instrument, 46—near-road-surface humidity sensor, 47—visibility meter.

DESCRIPTION OF EMBODIMENTS

Specific implementations of the present disclosure are given below. It should be noted that the present disclosure is not limited to the following specific embodiments, and all equivalent transformations made on the basis of the technical solutions of the present disclosure fall within the protection scope of the present disclosure.

Figure 2:
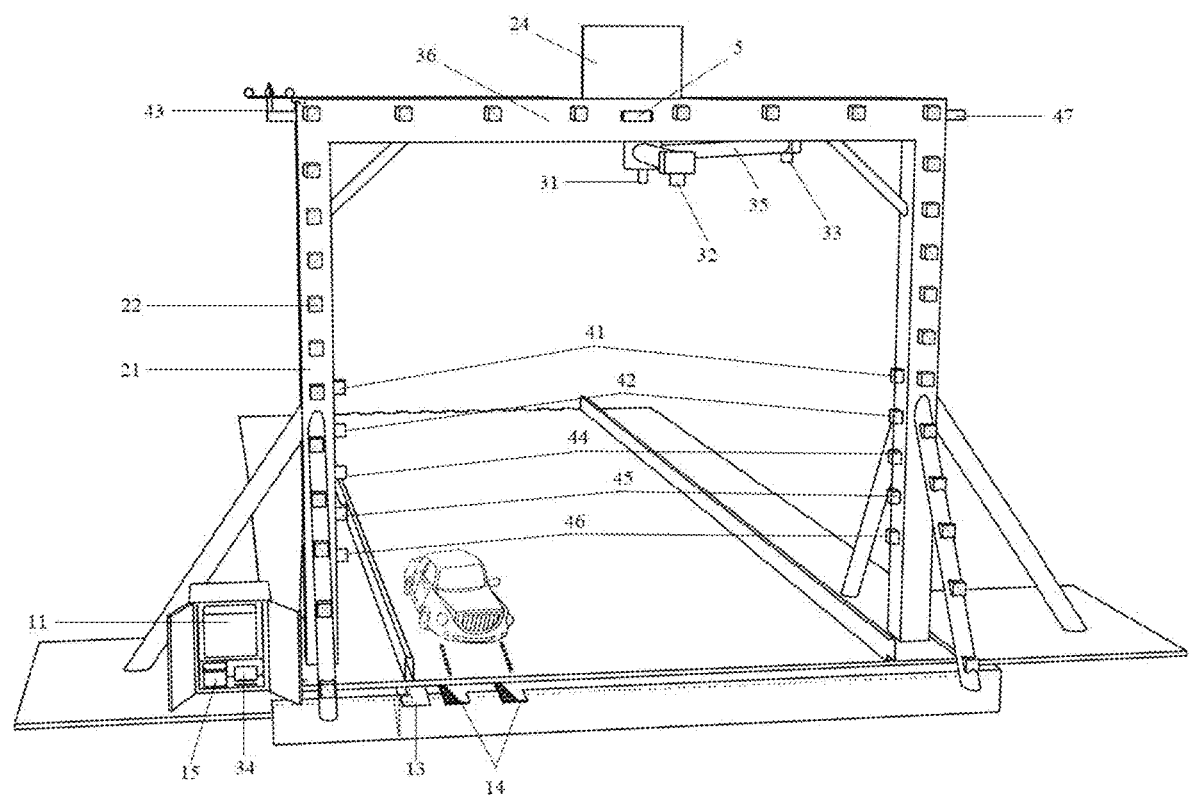
FIG. 2 is a schematic diagram of an overall structure of the present disclosure.

As shown in FIG. 1 and FIG. 2, the present disclosure discloses an intelligent safe vehicle speed measurement method and units capable of considering a state of a road surface, the units including a power supply unit, a warning reminder unit, a laser scanning unit, a skid resistance prediction unit, and a wireless communication unit;

The power supply unit 1 includes a traditional power module, a solar power module, a thermoelectric power generation module, a pressure power generation module, and a power storage box 15. Among them, the traditional power module includes transformers 11 and supporting circuits; the solar power module include solar photovoltaic panels 12 and supporting circuits, the thermoelectric power generation module include thermoelectric power generators 13 and supporting circuits, and the pressure power generation module include pressure power generators (e.g., piezoelectric ceramic) 14 and supporting circuits. The solar photovoltaic panels 12, the thermoelectric power generators 13, the pressure power generators 14, and the transformers 11 are connected to the power storage box 15. The power supply unit 1 is configured to supply power from various sources to components in the system by the transformers 11. The traditional power module supplies electric power to the street lamps in urban areas. The solar power module adopts solar photovoltaic panels for power generation, and the obtained electrical energy is stored in the power storage box. The thermoelectric power generation module adopts thermoelectric power generation sheets combined with a heat conducting plate, and generates electricity by using a difference between a high temperature of a black asphalt pavement and a low temperature of a roadside underground water pipe or an underground soil, and the obtained electric energy is stored in the power storage box. The pressure power generator adopts a piezoelectric ceramic, and generates electricity by using a vehicle load to deform the piezoelectric ceramic, and the obtained electric energy obtained is stored in the power storage box.

The warning reminder unit 2 includes a windproof and anti-collision bracket 21, warning lights 22, reflective strips 23, and a speed-limiting LED warning screen 24. The windproof and anti-collision bracket 21 is arranged on both sides of the structure to facilitate the stability of the bracket. The reflective strips 23 are arranged on the entire frame, the warning lights 22 are arranged on the frame with an equal interval, and the speed-limiting LED warning screen 24 is arranged on a crossbeam 36. The windproof and anti-collision bracket is arranged on both sides of the road to provide support and protection for the entire installation; a reflective warning sign is composed of LED warning lights and reflective strips, and is used to display the overall frame of the installation at night and warn vehicles. The speed-limiting LED warning screen uses an LED screen to provide safe speed recommendations for vehicles that are not equipped with a wireless communication device.

The laser scanning unit 3 includes a laser 31, a first camera 32, a second camera 33, a computer 34, a cantilever 35, and the crossbeam 36. The laser 31 is located below a middle portion of the crossbeam 36, and the first camera 32 and the second camera 33 are arranged at the ends of the cantilever 35, respectively. The cantilever 35 is rotatable. The transformer 12, the power storage box 15 and the computer 34 are jointly arranged in a protective box beside the windproof and anti-collision bracket 21. The laser is installed in the middle of the crossbeam of the frame and is used to generate infrared laser to scan the texture of the road surface. The camera 1 and the camera 2 recognize the texture of the road surface by receiving the reflected infrared laser. The computer processes the texture of the road surface obtained by the cameras to finally obtain a three-dimensional surface topography of the road.

The skid resistance prediction unit 4 includes an infrared temperature gun 41, a road surface water film thickness measuring instrument 42, an aerovane 43, a road surface snow thickness measuring instrument 44, a road surface ice thickness measuring instrument 45, a near-road-surface humidity sensor 46, and a visibility meter 47. The infrared temperature gun 41, the road surface water film thickness measuring instrument 42, the road surface snow thickness measuring instrument 44, the road surface ice thickness measuring instrument 45, and the near-road-surface humidity sensor 46 are placed at an inside of the frame, and the aerovane 43 and the visibility meter 47 are each located at the outer top of the frame. The skid resistance prediction unit includes a finite element tire-road surface contact module, a braking distance prediction module, and an environmental response module. The finite element tire-road surface contact module is configured to perform contact simulation on vehicle tires and the scanned texture through a computer to obtain contact stress distributions, i.e., tire-road surface contact relationships. The braking distance prediction module is configured to predict a braking distance of a vehicle by using a pre-stored regression curve of tire-road surface contact relationships and braking distances, and correct the predicted braking distance based on a temperature, a humidity, a water film thickness, a snow thickness and an ice thickness of the road surface to obtain a real-time braking distance prediction result. The environmental response module is configured to inversely calculate a safe speed suitable for the vehicle based on the real-time braking distance prediction result in accordance with a distance to vehicles ahead, a road width, a turning radius and a visibility condition.

The wireless communication unit 5 is arranged in the middle of the crossbeam 36 and located below the speed-limiting LED warning screen 24. The wireless communication unit broadcasts the safe vehicle speed to the incoming vehicle through commonly used intelligent vehicle wireless communication methods, such as C-V2X, LiFi, etc.

Figure 3:
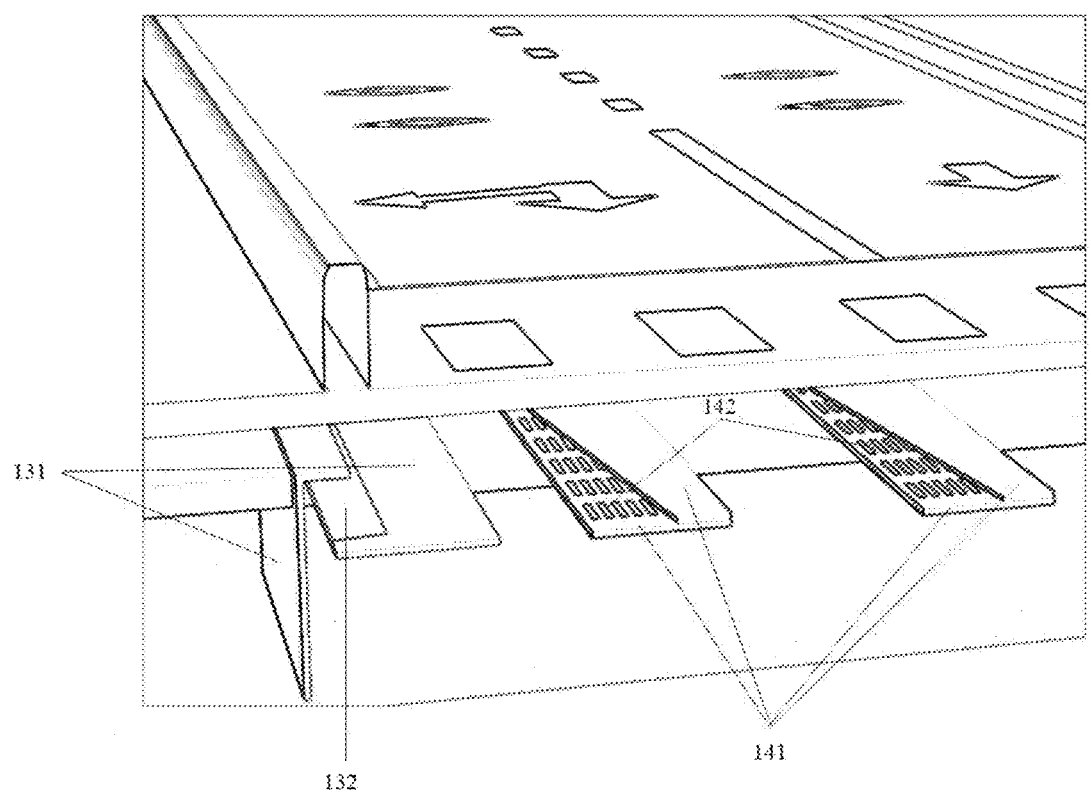
FIG. 3 is a schematic diagram of a thermoelectric power generator and a pressure power generator in a power supply unit.

As shown in FIG. 3, in one embodiment of the present disclosure, the thermoelectric power generator 13 is composed of heat conducting plates 131 and a thermoelectric power generation sheet 132. The heat conducting plates 131 are configured to transmit a high temperature of the road surface and a low temperature of a subgrade soil to two ends of the thermoelectric power generation sheet 132, respectively, to convert the temperature difference into an electromotive force difference to generate electricity. The pressure power generator 14 is composed of an encapsulation material 141 and piezoelectric ceramic sheets 142. The encapsulation material 141 plays the role of combining and protecting the piezoelectric ceramic sheets 142, ensuring that the pressure power generator 14 is not damaged within a certain degree of deformation. The piezoelectric ceramic sheets 142 are configured to deform under the action of the upper load to generate electricity. The thermoelectric power generator 13 and the pressure power generator 14 are both arranged in a middle portion of a road surface layer.

Figure 4:
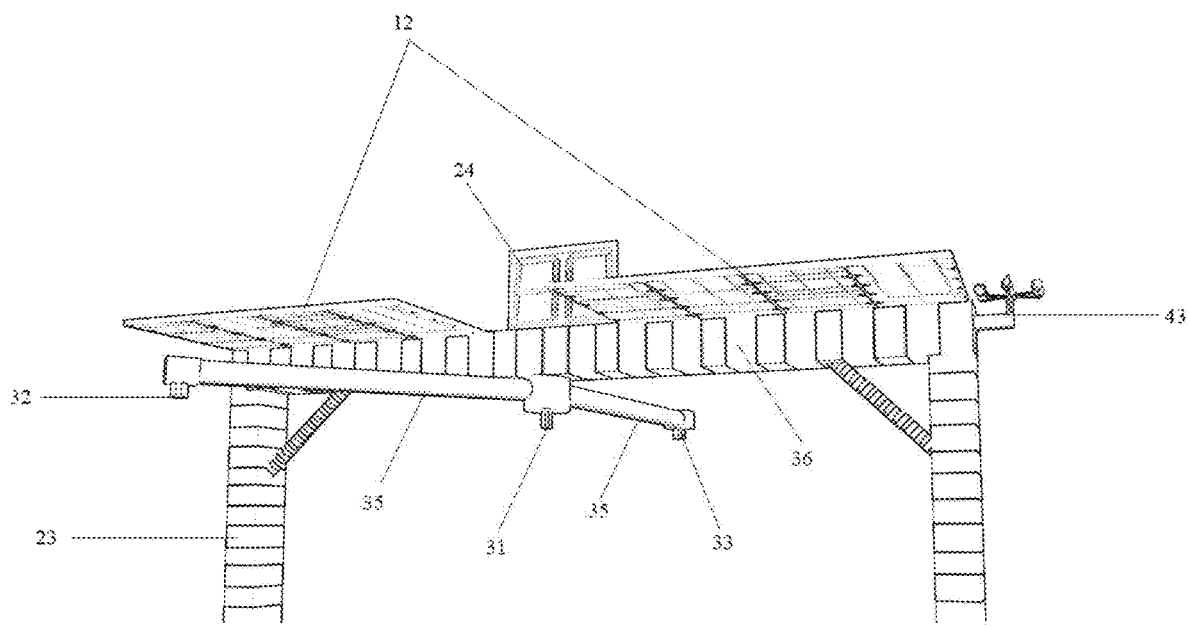
FIG. 4 is a schematic diagram of a laser scanning unit.

As shown in FIG. 4, in one embodiment of the present disclosure, the laser 31 is located below a middle portion of the crossbeam 36, and the first camera 32 and the second camera 33 are arranged at the ends of the cantilever 35, respectively. The cantilever 35 is rotatable.

The use and operation processes of the units of the present disclosure are described below:

First, the entire system is powered by the power supply unit 1. In the coverage area of the city electric power supply, the city electric power is converted by the transformer 11 for power supply; outside the coverage of the city electric power supply, the solar photovoltaic panels 12, the thermoelectric power generator 13 and the pressure power generator 14 are adopted to generate electricity, the obtained electric energy is stored in the power storage box 15, and then the power is supplied to the system, such as a computer 34, a laser 31, a first camera 32, a second camera 33, warning lights 22, a speed-limiting LED warning screen, an infrared temperature gun 41, a road surface water film thickness measuring instrument 42, an aerovane 43, a road surface snow thickness measuring instrument 44, a road surface ice thickness measuring instrument 45, a near-road-surface humidity sensor 46, and visibility meter 47.

During the operation of the system at night, the laser scanning unit 3 scans the road surface at night. On the one hand, the interference of strong sunlight can be avoided at night, and on the other hand, there is less traffic at night, which can avoid vehicle interference during the scanning process. The laser 31 placed below the middle portion of the crossbeam 36 emits infrared laser. The first camera 32 and the second camera 33 at the top ends of the cantilever 35 receive the reflected infrared laser, and transmit the data back to the computer 34 to obtain the texture of the road surface. In addition, since the change of the texture of the road surface is slow, a scanning time interval for scanning the texture of the road surface can be selected depending on the power status of the power storage box. After the texture of the road surface is obtained, stress simulation is performed on vehicles with a variety of loads and tire patterns by using a finite element program preset in the computer 34, to update the tire-road surface contact relationships and corresponding braking distances stored in the system.

During the operation of the system during the daytime, the wireless communication unit 5 obtains a vehicle model, a load, and tire information of an incoming vehicle, and search for a pre-stored tire-road surface contact relationship in the system, so as to select best matching data and obtain a corresponding predicted braking distance; the infrared temperature gun 41, the road surface water film thickness measuring instrument 42, the aerovane 43, the road surface snow thickness measuring instrument 44, the road surface ice thickness measuring instrument 45 and near-road-surface humidity sensor 46 are adopted to acquire the temperature, the humidity, the wind speed, the water film thickness, the snow thickness and the ice thickness of the road surface, to correct the obtained predicted braking distance in accordance with a preset correction program. The visibility meter 47 and built-in map information (road width, turning radius and information of road ahead, etc.) are adopted to convert the corrected braking distance to obtain a safe running speed suitable for the incoming vehicle. On the one hand, the speed-limiting LED warning screen broadcasts the speed; and on the other hand, the safe running speed is transmitted to a vehicle intelligent operating system through the wireless communication unit 5, for example in a manner of Bluetooth, NFC, and C-V2X, etc.

The above description is merely preferred specific implementations of the present disclosure. However, the protection scope of the present disclosure is not limited thereto. Equivalent substitutions or changes made by any one skilled in the art within the technical scope of the conclusions of the present disclosure based on the technical solutions of the present disclosure and inventive concepts thereof shall fall within the protection scope of the present disclosure.

What is claimed is:

1. An intelligent safe vehicle speed measurement system capable of considering a state of a road surface, comprising: a power supply unit, a warning reminder unit, a laser scanning unit, a skid resistance prediction unit, and a wireless communication unit, wherein the laser scanning unit is configured to: scan the road surface to obtain a texture of the road surface, and perform stress simulation on vehicles with a variety of loads and tire patterns, to update tire-road surface contact relationships and corresponding braking distances;

the wireless communication unit is configured to: obtain a vehicle model, a load and tire information of an incoming vehicle, and obtain a tire-road surface contact relationship, to select best matching data and obtain a predicted braking distance;

the skid resistance prediction unit is configured to: obtain environmental parameters of the road surface to correct the obtained predicted braking distance, and obtain a safe running speed suitable for the incoming vehicle through conversion of the corrected braking distance;

the warning reminder unit is configured to recommend the safe running speed for the incoming vehicle; and the power supply unit is configured to supply electric energy for the warning reminder unit, the laser scanning unit, the skid resistance prediction unit, and the wireless communication unit, wherein the skid resistance prediction unit further comprises a finite element tire-road surface contact module, a braking distance prediction module, and an environmental response module, wherein the finite element tire-road surface contact module is configured to perform contact simulation on vehicle tires and the scanned texture through a computer to obtain contact stress distributions, that is, the tire-road surface contact relationships;

the braking distance prediction module is configured to: predict a braking distance of a vehicle by using a pre-stored regression curve of tire-road surface contact relationships and braking distances, and correct the predicted braking distance based on a temperature, a humidity, a water film thickness, a snow thickness and an ice thickness of the road surface to obtain a real-time braking distance prediction result; and the environmental response module is configured to inversely calculate a safe speed suitable for the vehicle based on the real-time braking distance prediction result in accordance with a distance to vehicles ahead, a road width, a turning radius and a visibility condition.

2. The intelligent safe vehicle speed measurement system capable of considering the state of the road surface according to claim 1, wherein the power supply unit comprises a transformer, a power generator, and a power storage box, wherein both the power generator and the transformer are connected to the power storage box.

3. The intelligent safe vehicle speed measurement system capable of considering the state of the road surface according to claim 2, wherein the power generator comprises solar photovoltaic panels, a thermoelectric power generator, and a pressure power generator, wherein the pressure power generator is located under wheel track bands, the thermoelectric power generator is located on two sides of a road, and the solar photovoltaic panel is located on the two sides above the road.

4. The intelligent safe vehicle speed measurement system capable of considering the state of the road surface according to claim 3, wherein the thermoelectric power generator comprises heat conducting plates and a thermoelectric power generation sheet; the heat conducting plates and the thermoelectric power generation sheet are arranged in a middle portion of an asphalt pavement layer on the two sides of the road; and the heat conducting plates are configured to transmit a high temperature of the road surface and a low temperature of a subgrade soil to two ends of the thermoelectric power generation sheet, respectively, to generate electricity; and the pressure power generator comprises an encapsulation material and piezoelectric ceramic sheets that are arranged under the wheel track bands, and the encapsulation material is wrapped on an outer side of the piezoelectric ceramic sheets, and the piezoelectric ceramic sheets are configured to deform under an action of a load thereon to generate electricity.

5. The intelligent safe vehicle speed measurement system capable of considering the state of the road surface according to claim 1, wherein the warning reminder unit comprises a windproof and anti-collision bracket, warning lights, reflective strips, and a speed-limiting LED warning screen, wherein the windproof and anti-collision bracket is supported above road shoulders, the warning lights and the reflective strips are evenly arranged on the windproof and anti-collision bracket with an equal interval, and the speed-limiting LED warning screen is located above an middle portion of a crossbeam in the laser scanning unit and is configured to broadcast the safe running speed of the incoming vehicle obtained by the skid resistance prediction unit.

6. The intelligent safe vehicle speed measurement system capable of considering the state of the road surface according to claim 1, wherein the laser scanning unit comprises a laser, a first camera, a second camera, a computer, a cantilever, and a crossbeam; the laser is installed in a middle of the crossbeam; and the first camera and the second camera are located at two ends of the cantilever, respectively; and the laser is configured to emit infrared laser light, the first camera and the second camera are configured to receive reflected infrared laser light and transmit data back to the computer to obtain the texture of the road surface, and the computer is configured to perform the stress simulation on the vehicles with the variety of loads and tire patterns through a preset finite element program to update the tire-road surface contact relationships and the corresponding braking distances stored in the system.

7. The intelligent safe vehicle speed measurement system capable of considering the state of the road surface according to claim 1, wherein the skid resistance prediction unit comprises an infrared temperature gun, a road surface water film thickness measuring instrument, an aerovane, a road surface snow thickness measuring instrument, a road surface ice thickness measuring instrument, a near-road-surface humidity sensor, and a visibility meter, wherein the infrared temperature gun, the road surface water film thickness measuring instrument, the road surface snow thickness measuring instrument, the road surface ice thickness measuring instrument, and the near-road-surface humidity sensor are located at an inner side of the windproof and anti-collision bracket; and the aerovane and the visibility meter are located at two ends of a crossbeam in the laser scanning unit, respectively; and wherein the infrared temperature gun, the road surface water film thickness measuring instrument, the aerovane, the road surface snow thickness measuring instrument, the road surface ice thickness measuring instrument, and the near-road-surface humidity sensor are configured to obtain the environmental parameters of the road surface, and transmit the environmental parameters to a computer in the laser scanning unit for processing.

8. The intelligent safe vehicle speed measurement system capable of considering the state of the road surface according to claim 1, wherein the wireless communication unit is further configured to transmit the safe running speed of the incoming vehicle obtained by the skid resistance prediction unit to a vehicle intelligent operating system.

9. An intelligent safe vehicle speed measurement method capable of considering a state of a road surface, comprising:

scanning the road surface to obtain a texture of the road surface, and performing stress simulation on vehicles with a variety of loads and tire patterns, to update tire-road surface contact relationships and corresponding braking distances;

obtaining a vehicle model, a load and tire information of an incoming vehicle, and obtaining a tire-road surface contact relationship, to select best matching data and provide a corresponding predicted braking distance;

obtaining environmental parameters of the road surface to correct the obtained predicted braking distance, and obtaining a safe running speed suitable for the incoming vehicle through conversion of the corrected braking distance; and recommending the safe running speed for the incoming vehicle, wherein the method further comprises:

performing contact simulation on vehicle tires and the scanned texture through a computer to obtain contact stress distributions, that is, the tire-road surface contact relationships;

predicting a braking distance of a vehicle by using a pre-stored regression curve of tire-road surface contact relationships and braking distances, and correcting the predicted braking distance based on a temperature, a humidity, a water film thickness, a snow thickness and an ice thickness of the road surface to obtain a real-time braking distance prediction result; and inversely calculating a safe speed suitable for the vehicle based on the real-time braking distance prediction result in accordance with a distance to vehicles ahead, a road width, a turning radius and a visibility condition.

* * * * *